United States Patent
Wu et al.

(10) Patent No.: US 10,795,051 B2
(45) Date of Patent: Oct. 6, 2020

(54) THREE-DIMENSIONAL DIGITAL VIRTUAL IMAGING DEVICE AND METHOD FOR STRATIGRAPHIC TEXTURE OF BOREHOLE CORE

(71) Applicants: WUHAN CHANGSHENG MINE SECURITY TECHNOLOGY LIMITED, Wuhan, Hubei (CN); CHINA UNIVERSITY OF MINING AND TECHNOLOGY, BEIJING, Beijing (CN)

(72) Inventors: Qiang Wu, Beijing (CN); Liu Liu, Beijing (CN); Yifan Zeng, Beijing (CN); Fengjuan Tao, Beijing (CN); Chunsheng Liu, Beijing (CN)

(73) Assignee: WUHAN CHANGSHENG MINE SECURITY TECHNOLOGY LIMITED, Wuhan (CN)

( * ) Notice: Subject to any disclaimer, the term of this patent is extended or adjusted under 35 U.S.C. 154(b) by 98 days.

(21) Appl. No.: 16/134,297

(22) Filed: Sep. 18, 2018

(65) Prior Publication Data
US 2019/0086577 A1    Mar. 21, 2019

(51) Int. Cl.
*H04N 5/225*    (2006.01)
*G01V 8/02*    (2006.01)
(Continued)

(52) U.S. Cl.
CPC .............. *G01V 8/02* (2013.01); *G01V 3/083* (2013.01); *H04N 5/2253* (2013.01);
(Continued)

(58) Field of Classification Search
None
See application file for complete search history.

(56) References Cited

U.S. PATENT DOCUMENTS

| 2014/0351183 | A1* | 11/2014 | Germain | G06N 20/00 |
| | | | | 706/12 |
| 2015/0153474 | A1* | 6/2015 | Donderici | G01V 3/38 |
| | | | | 324/339 |

* cited by examiner

*Primary Examiner* — Mulugeta Mengesha
*Assistant Examiner* — Charles N Hicks
(74) *Attorney, Agent, or Firm* — Luoh J. Wu; Continent Patent Office LLP

(57) ABSTRACT

Disclosed is a three-dimensional digital virtual imaging device for stratigraphic texture of borehole core, wherein the probe depth counting pulley is mounted on the lifting wire frame, the output shaft of the motor is configured to drive the reel to rotate, and one end of the cable is connected to the cable transfer node of the retractable reel, the signal input end of the borehole imaging trajectory measuring probe of the on-site imaging host is electrically connected to one end of the cable through the cable transfer node of the retractable reel, the cable is wound on the retractable reel, a retractable line is controlled by the retractable reel, the cable is extended and retracted on the probe depth counting pulley, the probe depth counting pulley records the length of the retractable line of the cable, the depth feedback signal output end of the depth counting pulley is connected to the depth feedback signal input end of the on-site imaging host, the motor control signal output end of the on-site imaging host is connected to the control signal input end of the motor, and the signal output end of the borehole imaging trajectory measuring probe is connected to the other end of the cable. It can automatically generate borehole video, two-dimensional digital virtual borehole core image and 3D borehole trajectory in real time.

7 Claims, 2 Drawing Sheets

(51) Int. Cl.
*H04N 5/232* (2006.01)
*H04N 7/18* (2006.01)
*G01V 3/08* (2006.01)

(52) U.S. Cl.
CPC ......... *H04N 5/23238* (2013.01); *H04N 7/185* (2013.01); *G01V 2003/084* (2013.01); *G01V 2003/085* (2013.01); *H04N 2005/2255* (2013.01)

THREE-DIMENSIONAL DIGITAL VIRTUAL IMAGING DEVICE AND METHOD FOR STRATIGRAPHIC TEXTURE OF BOREHOLE CORE

FIELD OF THE INVENTION

The invention relates to the technical field of geotechnical engineering survey and construction, in particular to a three-dimensional digital virtual imaging device and method for stratigraphic texture of borehole core.

BACKGROUND

The Ministry of Construction of China has advocated the acceleration of the transformation of traditional industries with high-tech and advanced applicable technology in the "Key Elements of Industrial Exploration Technological Progress and Technical Policy (issued as [2003]-202)", and focused on the promotion of high-definition digital panoramic borehole imaging system applied in hydrology and geological survey work.

The Ministry of Land and Resources of China has decided to carry out geological exploration qualification registration in China in the "Notice on the Registration of Geological Exploration Qualifications" issued as [2005]-41, and specified the equipments that should be provided for different qualifications. According to the spirit of the document, the qualifications of Class A and B in hydrogeology, engineering geology, environmental geological survey, liquid mineral exploration and geophysical exploration must be equipped with borehole TV imaging camera to improve the technical level of geological exploration and the degrees of digitization and visualization.

Most of the traditional borehole TV imager are borehole video recorder which cannot generate digital virtual borehole image, and cannot measure the borehole stratigraphic texture. With the improving requirements of geological exploration, the borehole video recorder cannot meet the technical requirements of geological exploration. Driven by the development of electronic and computer technology, some borehole TV imagers capable of generating two-dimensional borehole core images have been developed, which meet the requirements of some geological surveys to measure some stratigraphic textures. However, in some borehole exploration, the borehole is often easy to be tilted and the borehole trajectory may change, resulting in that the geological structure measurement often appears different from the actual one.

REFERENCES

[1] "Key Elements of Industrial Exploration Technological Progress and Technical Policy" (issued by the Ministry of Construction of China, [2003]-202);

[2] "Notice on the Registration of Geological Exploration Qualifications" issued by the Ministry of Land and Resources of China, [2005]-41.

SUMMARY OF THE INVENTION

An object of the present invention is to provide a three-dimensional digital virtual imaging device and method for stratigraphic texture of borehole core, which abandons the system structure patterns comprising a combination of video capture card, controller, notebook computer and probe and manual profile editing modes in prior art. It adopts advanced image acquisition and processing technology and three-dimensional measurement sensing technology of borehole trajectory, and has a highly integrated system and a probe with panoramic camera. It can automatically generate borehole video images, two-dimensional digital virtual borehole core images and three-dimensional borehole trajectory, wherein the image is clear and realistic, and the orientation, inclination and depth are automatically and accurately calibrated. It is suitable for all omnidirectional and full-tilt boreholes to implement full cylindrical observation imaging (vertical borehole\horizontal borehole\slant borehole\depression or elevation borehole), and can perform three-dimensional regional stratigraphic texture imaging on all the boreholes in the survey area.

In order to solve the above technical problem, the present invention discloses a three-dimensional digital virtual imaging device for stratigraphic texture of borehole core, comprising an on-site imaging host, a lifting wire frame, a borehole imaging trajectory measuring probe, a cable, a probe depth counting pulley, a motor and a retractable reel, wherein the probe depth counting pulley is mounted on the lifting wire frame, the output shaft of the motor is configured to drive the reel to rotate, and one end of the cable is connected to the cable transfer node of the retractable reel, the signal input end of the borehole imaging trajectory measuring probe of the on-site imaging host is electrically connected to one end of the cable through the cable transfer node of the retractable reel, the cable is wound on the retractable reel, a retractable line is controlled by the retractable reel, the cable is extended and retracted on the probe depth counting pulley, the probe depth counting pulley records the length of the retractable line of the cable, the depth feedback signal output end of the probe depth counting pulley is connected to the depth feedback signal input end of the on-site imaging host, the motor control signal output end of the on-site imaging host is connected to the control signal input end of the motor, the borehole imaging trajectory measuring probe is situated coaxially with the borehole, and the borehole imaging trajectory measuring probe comprises a camera and a three-dimensional attitude sensor, wherein the signal output ends of the camera and the three-dimensional attitude sensor are connected to the other end of the cable, and the camera is configured to obtain the imaging data of stratum in the borehole and the three-dimensional attitude sensor is configured to obtain the trajectory data of the borehole imaging trajectory measuring probe running in the borehole.

A three-dimensional digital virtual imaging method for stratigraphic texture of borehole core by using the above-mentioned device, comprising the steps of:

Step 1—placing the lifting wire frame in an orifice area of the borehole, mounting the depth counting pulley on the lifting wire frame, and installing the cable on the depth counting pulley;

Step 2: lowering the borehole imaging trajectory measurement probe to the bottom of the borehole at a constant speed through the motor controlled by the on-site imaging host, detecting the imaging data of stratum in the borehole in real time during the lowering of the borehole imaging trajectory measurement probe, and obtaining the trajectory data of the imaging trajectory measuring probe running in the borehole by the three-dimensional attitude sensor in real time, and transmitting the imaging data of stratum in the borehole and the trajectory data of the borehole imaging trajectory measuring probe running in the borehole to the on-site imaging host through the cable, and transmitting the depth data of the borehole imaging trajectory measuring probe in the borehole to the on-site imaging host by using the probe depth counting pulley, performing a time-alignment of the imaging data of stratum in the borehole with the depth data of the borehole imaging trajectory measuring probe in the borehole by using the on-site imaging host, and generating a two-dimensional digital virtual overall image of the borehole core, wherein the two-dimensional digital virtual overall image of the borehole core comprises a two-dimensional digital virtual core image at each depth from the orifice to the bottom of the borehole, and performing a time-alignment of the trajectory data of the borehole imaging trajectory measuring probe in the borehole with the depth data of the borehole imaging trajectory measuring probe in the borehole to generates a borehole trajectory map by using the on-site imaging host, and;

Step 3: transmitting the two-dimensional digital virtual core overall image and the borehole trajectory map to a computer by the on-site imaging host, and generating a three-dimensional digital virtual image of stratigraphic texture of borehole core according to the two-dimensional digital virtual core image and the borehole trajectory map by the computer.

The beneficial effects of the invention:

The invention can generate borehole video, two-dimensional digital virtual borehole core images and borehole trajectory. It is suitable for all omnidirectional and full-tilt boreholes to implement full cylindrical observation imaging (vertical borehole\horizontal borehole\slant borehole\depression or elevation borehole). It can generate a 3D digital virtual image of borehole core for regional exploration of multi-boreholes by combination of 3D coordinate data of the borehole orifice with the 3D digital virtual imaging data of stratigraphic texture of the borehole core, can digital virtual core, can perform a comprehensive analysis of regional stratigraphic texture for all borehole image data in the region, and improve the level of geological exploration technology and the degree of visualization and visualization of the results data.

Figure 1:
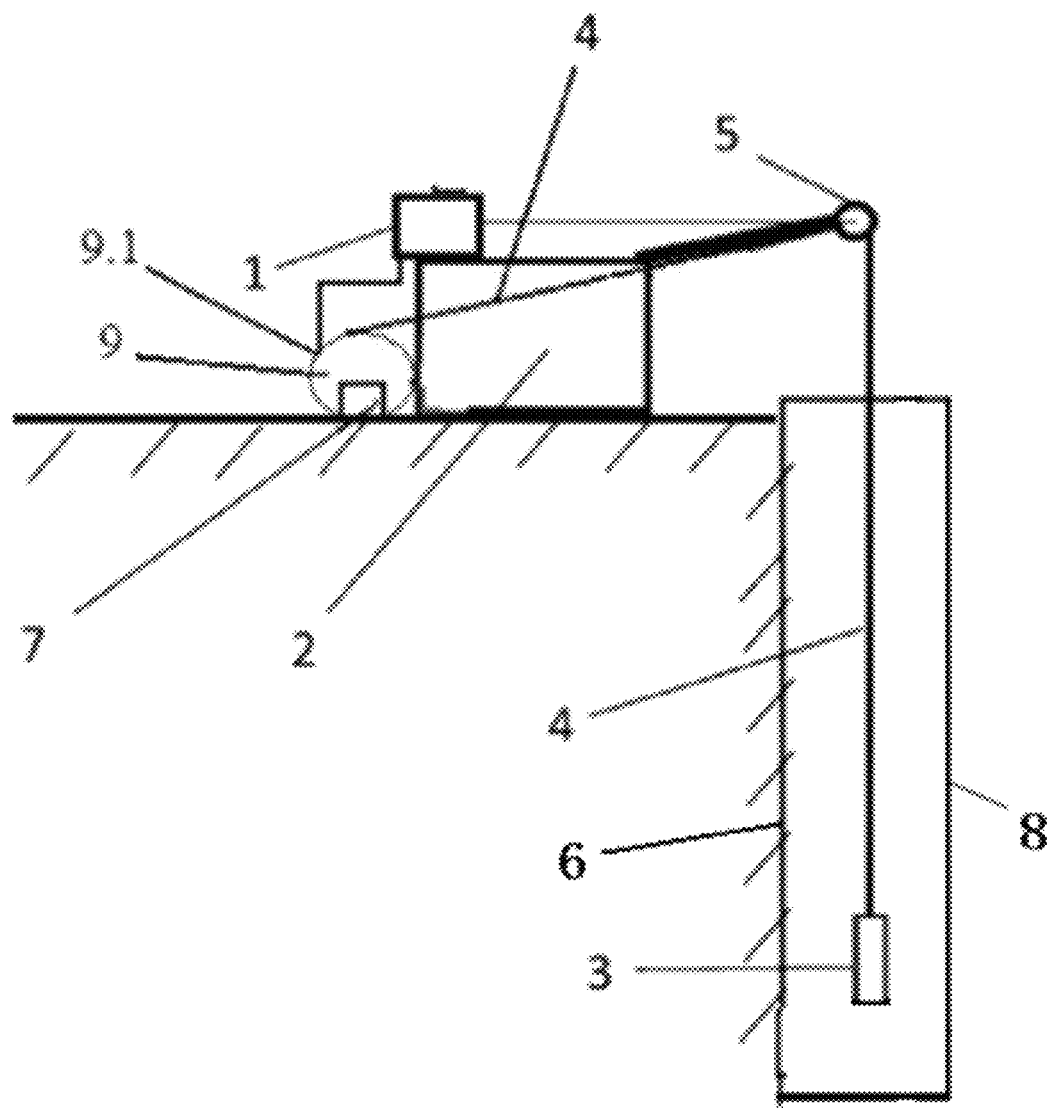
FIG. 1 is a schematic structural view of the present invention in use.
Figure 2:
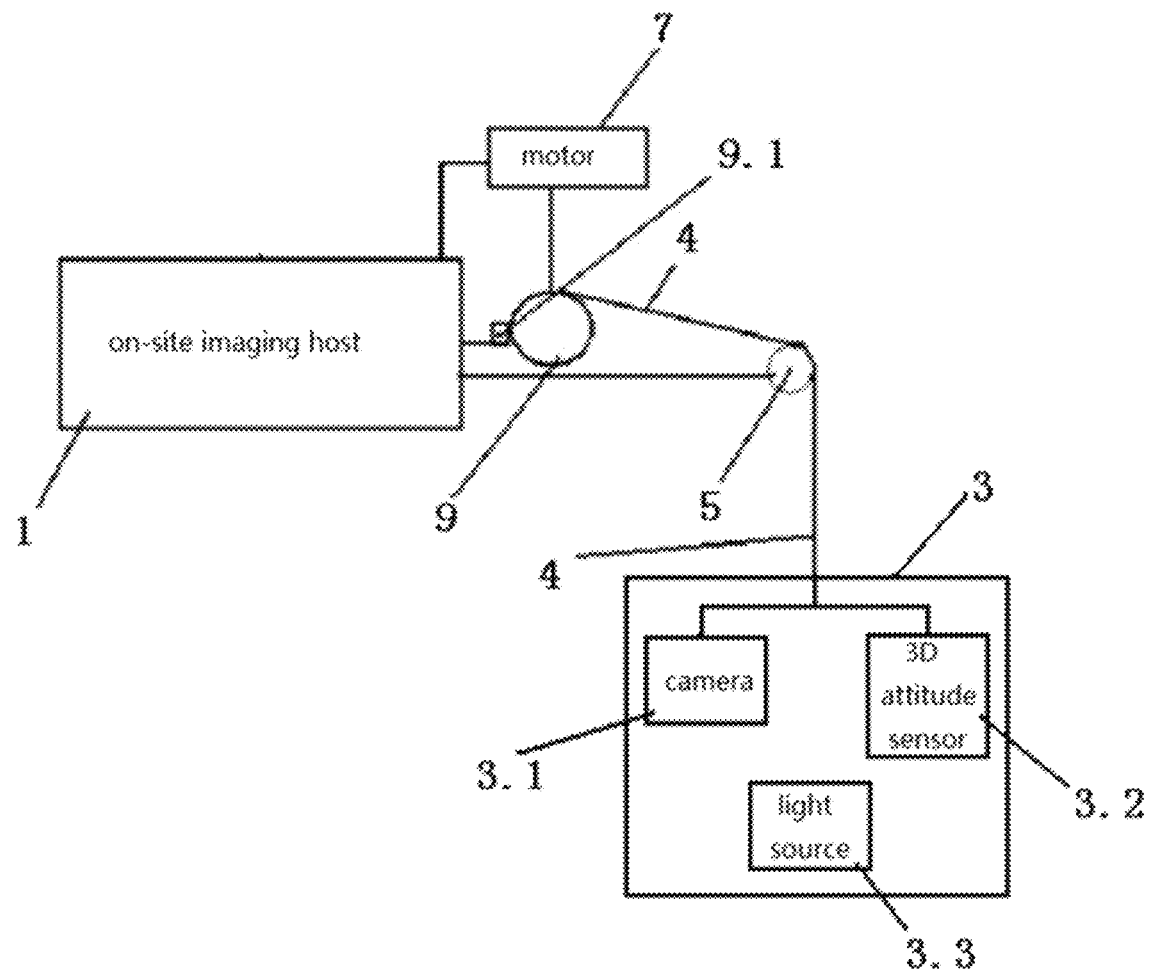
FIG. 2 is a schematic block diagram of the electronic control portion of the present invention.

1—on-site imaging host; 2—lifting wire frame; 3—borehole imaging trajectory measuring probe; 3.1—camera; 3.2—3D attitude sensor; 3.3—light source; 4—cable; 5—probe depth counting pulley; 6—stratum; 7—motor; 8—borehole; 9—retractable reel; 9.1—cable transfer node.

DESCRIPTION OF THE PREFERRED EMBODIMENTS

The present invention will be further described in detail below with reference to the accompanying drawings and specific embodiments.

The invention provides a three-dimensional digital virtual imaging device for stratigraphic texture of borehole core, comprising an on-site imaging host 1, a lifting wire frame 2, a borehole imaging trajectory measuring probe 3, a cable 4, a probe depth counting pulley 5, a motor 7 and a retractable reel 9. The probe depth counting pulley 5 is mounted on the lifting wire frame 2, the output shaft of the motor 7 is configured to drive the reel 9 to rotate, one end of the cable 4 is connected to the cable transfer node 9.1 of the retractable reel 9, the signal input end for the borehole imaging trajectory measuring probe of the on-site imaging host 1 is electrically connected to one end of the cable 4 through the cable transfer node 9.1 of the retractable reel 9, the cable 4 is wound on the retractable reel 9, a retractable line is controlled by the retractable reel 9, the cable 4 is extended and retracted on the probe depth counting pulley 5, the probe depth counting pulley 5 records the length of the retractable line of the cable 4, the depth feedback signal output end of the depth counting pulley 5 is connected to the depth feedback signal input end of the on-site imaging host, the motor control signal output end of the on-site imaging host 1 is connected to the control signal input end of the motor 7, and the borehole imaging trajectory measuring probe 3 is situated coaxially with the borehole 8 (that is, the probe 3 is situated in center of the borehole 8, so as to ensure that the image of borehole wall generated by the probe 3 is symmetrical and uniform, and there is no deviation in interpreting the measurements). The borehole imaging trajectory measuring probe 3 comprises a camera 3.1 and a three-dimensional attitude sensor 3.2, in which the signal output ends of the camera 3.1 and the three-dimensional attitude sensor 3.2 are connected to the other end of the cable 4, and the camera 3.1 is configured to obtain the imaging data of stratum in the borehole 8 and the three-dimensional attitude sensor 3.2 is configured to obtain the trajectory data of the borehole imaging trajectory measuring probe 3 running in the borehole 8.

Such design is simple in structure and is convenient for three-dimensional imaging for stratigraphic texture of the borehole 8.

In the embodiment, the depth counting pulley 5 is configured to guide the signal cable 4 and record the retractable length of the signal cable 4.

In the embodiment, the three-dimensional attitude sensor 3.2 is further provided with a light source 3.3. The light source 3.3 is configured to illuminate the borehole 8, facilitating the camera 3.1 to obtain clear image data.

In the embodiment, the lifting wire frame 2 is mounted on the orifice area of the borehole 8.

In the embodiment, the camera 3.1 is a panoramic camera.

A three-dimensional digital virtual imaging method for stratigraphic texture of borehole core by using the above-mentioned device, comprising the steps of:

Step 1—placing the lifting wire frame 2 in the orifice area of the borehole 8, mounting the depth counting pulley 5 on the lifting wire frame 2, and installing the cable 4 on the depth counting pulley 5;

Step 2—lowering the borehole imaging trajectory measurement probe 3 to the bottom of the borehole 8 at a constant speed through the motor 7 controlled by the on-site imaging host 1, detecting the imaging data of stratum in the borehole 8 in real time during the lowering of the borehole imaging trajectory measurement probe 3, and obtaining the trajectory data of the imaging trajectory measuring probe 3 running in the borehole 8 by the three-dimensional attitude sensor 3.2 in real time, transmitting the imaging data of stratum in the borehole 8 and the trajectory data of the borehole imaging trajectory measuring probe 3 running in the borehole 8 to the on-site imaging host 1 through the cable 4, transmitting the depth data of the borehole imaging trajectory measuring probe 3 in the borehole 8 to the on-site imaging host 1 by using the probe depth counting pulley 5, performing a time-alignment of the imaging data of stratum in the borehole 8 with the depth data of the borehole imaging trajectory measuring probe 3 in the borehole 8 by using the on-site imaging host 1, and generating a two-dimensional digital virtual overall image of the borehole core, wherein the two-dimensional digital virtual overall image of the borehole core comprises a two-dimensional digital virtual core image at each depth from the orifice to the bottom of the borehole 8; and performing a time-alignment of the trajectory data of the borehole imaging trajectory measuring probe 3 in the borehole 8 with the depth data of the borehole imaging trajectory measuring probe 3 in the borehole 8 to generates a borehole trajectory map by using the on-site imaging host 1; and Step 3—transmitting the two-dimensional digital virtual core overall image and the borehole trajectory map to a computer by the on-site imaging host 1, and generating a three-dimensional digital virtual image of stratigraphic texture of borehole core according to the two-dimensional digital virtual core image and the borehole trajectory map by the computer;

Step 4—generating a three-dimensional digital virtual image of stratigraphic texture of the borehole core for regional exploration of multi-boreholes by combination of 3D coordinate data of the orifice of the borehole 8 with the three-dimensional digital virtual imaging data of stratigraphic texture of the borehole core.

In step 2 of the embodiment, the borehole imaging trajectory measuring probe 3 is lowered to the bottom in the borehole 8 at a constant speed in the axial direction of the borehole 8 by operating the on-site imaging host 1 to control the motor 7.

The invention constructs a three-dimensional digital virtual imaging of stratigraphic texture of the borehole core, and improves the level of geological exploration technology and the degree of digitization and visualization of the achieved data.

The technical contents without a detailed description in the specification should be well-known for those skilled in the art. It will be appreciated by those skilled in the art that variations and modifications are obvious within the scope of the appended claims.

The invention claimed is:

1. A three-dimensional digital virtual imaging device for stratigraphic texture of borehole core, comprising an on-site imaging host (1), a lifting wire frame (2), a borehole imaging trajectory measuring probe (3), a cable (4), a probe depth counting pulley (5), a motor (7) and a retractable reel (9), wherein the probe depth counting pulley (5) is mounted on the lifting wire frame (2), an output shaft of the motor (7) is configured to drive the reel (9) to rotate, one end of the cable (4) is connected to a cable transfer node (9.1) of the retractable reel (9), a signal input end for the borehole imaging trajectory measuring probe of the on-site imaging host (1) is electrically connected to one end of the cable (4) through the cable transfer node (9.1) of the retractable reel (9), the cable (4) is wound on the retractable reel (9), a retractable line is controlled by the retractable reel (9), the cable (4) is extended and retracted on the probe depth counting pulley (5), the probe depth counting pulley (5) records the length of the retractable line of the cable (4), a depth feedback signal output end of the depth counting pulley (5) is connected to a depth feedback signal input end of the on-site imaging host (1), a motor control signal output end of the on-site imaging host (1) is connected to a control signal input end of the motor (7), and the borehole imaging trajectory measuring probe (3) is situated coaxially with the borehole (8), wherein the borehole imaging trajectory measuring probe (3) comprises a camera (3.1) and a three-dimensional attitude sensor (3.2), signal output ends of the camera (3.1) and the three-dimensional attitude sensor (3.2) are connected to other end of the cable (4), and the camera (3.1) is configured to obtain imaging data of stratum in the borehole (8) and the three-dimensional attitude sensor (3.2) is configured to obtain the trajectory data of the borehole imaging trajectory measuring probe (3) running in the borehole (8).

2. The three-dimensional digital virtual imaging device for stratigraphic texture of borehole core of claim 1, wherein the three-dimensional attitude sensor (3.2) is further provided with a light source (3.3).

3. The three-dimensional digital virtual imaging device for stratigraphic texture of borehole core of claim 1, wherein the lifting wire frame (2) is mounted on the orifice area of the borehole (8).

4. The three-dimensional digital virtual imaging device for stratigraphic texture of borehole core of claim 1, wherein the camera (3.1) is a panoramic camera.

5. A three-dimensional digital virtual imaging method for stratigraphic texture of borehole core by using the device of claim 1, comprising the steps of:

Step 1—placing the lifting wire frame (2) in an orifice area of the borehole (8), mounting the probe depth counting pulley (5) on the lifting wire frame (2), and installing the cable (4) on the probe depth counting pulley (5);

Step 2: lowering the borehole imaging trajectory measurement probe (3) to the bottom of the borehole (8) at a constant speed through the motor (7) controlled by the on-site imaging host (1), detecting the imaging data of stratum in the borehole (8) in real time during the lowering of the borehole imaging trajectory measurement probe (3), obtaining the trajectory data of the imaging trajectory measuring probe (3) running in the borehole (8) by the three-dimensional attitude sensor (3.2) in real time, transmitting the imaging data of stratum in the borehole (8) and the trajectory data of the borehole imaging trajectory measuring probe (3) running in the borehole (8) to the on-site imaging host (1) through the cable (4), transmitting the depth data of the borehole imaging trajectory measuring probe (3) in the borehole (8) to the on-site imaging host (1) by using the probe depth counting pulley (5), performing a time-alignment of the imaging data of stratum in the borehole (8) with the depth data of the borehole imaging trajectory measuring probe (3) in the borehole (8) by using the on-site imaging host (1), and generating a two-dimensional digital virtual overall image of the borehole core, wherein the two-dimensional digital virtual overall image of the borehole core comprises a two-dimensional digital virtual core image at each depth from the orifice to the bottom of the borehole (8), and performing a time-alignment of the trajectory data of the borehole imaging trajectory measuring probe (3) in the borehole (8) with the depth data of the borehole imaging trajectory measuring probe (3) in the borehole (8) to generate a borehole trajectory map by using the on-site imaging host (1), and;

Step 3: transmitting the two-dimensional digital virtual overall image of the borehole core and the borehole (8) trajectory map to a computer by the on-site imaging host (1), and generating a three-dimensional digital virtual image of stratigraphic texture of the borehole core according to the two-dimensional digital virtual image of the borehole core and the borehole (8) trajectory map by the computer.

6. The three-dimensional digital virtual imaging method for stratigraphic texture of borehole core of claim 5, further comprising Step 4—generating a three-dimensional digital virtual image of stratigraphic texture of the borehole core for regional exploration of multi-boreholes by combination of 3D coordinate data of the orifice of the borehole (8) with the three-dimensional digital virtual imaging data of stratigraphic texture of the borehole (8) core.

7. The three-dimensional digital virtual imaging method for stratigraphic texture of borehole core of claim 5, wherein in step 2, the borehole imaging trajectory measuring probe (3) is lowered to the bottom in the borehole (8) at a constant speed in the axial direction of the borehole (8) by operating the on-site imaging host (1) to control the motor (7).

* * * * *